May 22, 1956     J. P. G. RATTE     2,746,649

QUADRUPLE SEASONING SHAKER

Filed July 15, 1952

INVENTOR.

Joseph P.G. Ratte

United States Patent Office 2,746,649
Patented May 22, 1956

2,746,649

QUADRUPLE SEASONING SHAKER

Joseph P. G. Ratte, San Diego, Calif.

Application July 15, 1952, Serial No. 298,938

1 Claim. (Cl. 222—142.9)

The present invention relates to a quadruple seasoning shaker and it consists in the combinations, constructions and arrangements of parts herein described and claimed.

Generally there is provided a shaker for condiments which is provided with a container atop which is threaded a dome-shaped dispenser element having a centrally located opening therein. Within the dome there is provided a circular plate having a quarter segment cut therefrom and having vertical walls extending from the sides of the cut away portion. The vertical walls have rounded outer edges to roughly conform with the inner sides of the dome and one of the walls is provided with an outwardly projecting handle which is adapted to extend through a circular slot formed in the dome which slot extends three-quarters of the distance of the circumference of such dome. The vertical walls are provided at their upper ends where the walls join together with an upwardly extending threaded stem which extends through the central opening in the dome and a knob is threaded to the outer end of such stem. The dome is provided with four equal segmental areas each of which is provided with a plurality of openings, such openings being of different sizes to accommodate the condiments which may be placed within the container. The container itself is vertically divided into segmental compartments wherein may be placed different condiments such as salt, pepper and the like and the device is such that by loosening the threaded knob and moving the handle to a desired position, a selected condiment may be dispensed through one of the segmental areas in the dome.

It is accordingly an object of the invention to provide a novel seasoning shaker having novel means for selectively dispensing the contents therein.

Another object of the invention is to provide a device of the character set forth which is simple in construction, inexpensive to manufacture and yet effective and efficient in use.

Other and further objects of the invention will become apparent from a reading of the following specification taken in conjunction with the drawing, in which.

Figure 1:
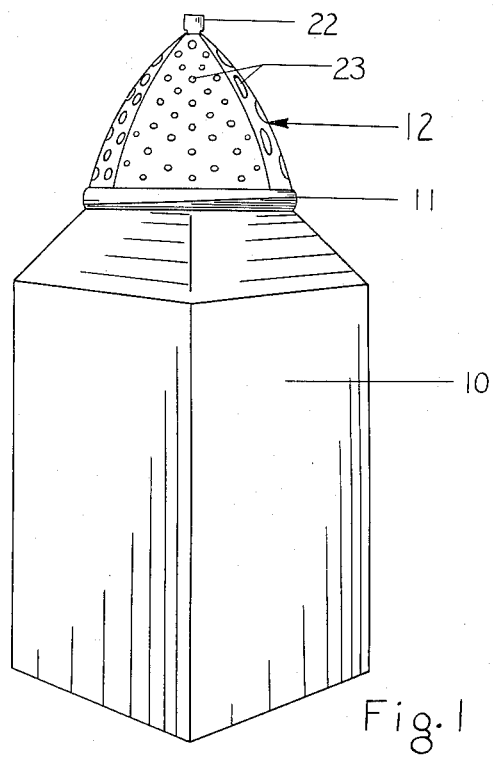
Figure 1 is a perspective view of an embodiment of the invention.
Figures 2, 3:
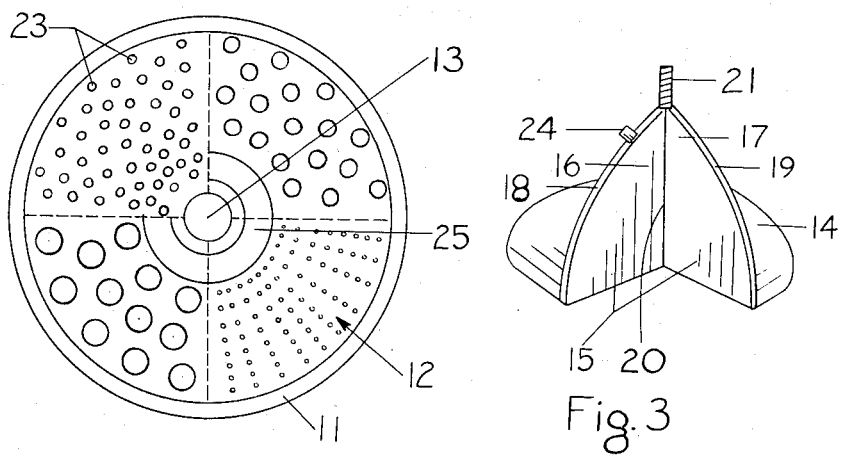
Figure 2 is an enlarged plan view of the device illustrated in Figure 1.
Figure 3 is a perspective view of an element of the invention.

Referring more particularly to the drawing, there is shown therein a container 10 which is interiorly divided in a vertical direction into four equal segmental compartments and provided at its upper end with a neck portion to which is threaded a base 11 of a dome 12 which is centrally provided with an opening 13.

A circular plate 14 is mounted within the dome at the lower end thereof and is provided with a cut away portion 15 which cut away portion represents one quarter segment of the plate 14. Extending upwardly from the sides of the opening 15 is a pair of vertical walls 16 and 17 having rounded outer edges, as indicated at 18 and 19, respectively. The walls 16 and 17 are integrally interconnected, as indicated at 20 and from the upper end of the juncture between the plates there extends a threaded pin 21 which is adapted to extend through the opening 13. A knob 22 is threadably mounted upon the pin 21 and is adapted to hold the plate and its associated walls 16 and 17 rigidly to the dome 12.

The dome is divided into four segmental areas each of which is provided with a plurality of openings 23, the openings 23 in any one of the segmental areas being of different sizes so that condiments of different types may be selectively dispensed therethrough.

In operation, it will be apparent that when it is desired to dispense a particular condiment from one of the segmental compartments within the receptacle 10, it is only necessary to loosen the knob 22 and to thereafter move a handle 24 which is formed integrally with the outer edge 18 of the plate 16 and which handle protrudes through a slot 25 formed in the dome 12 and which extends three-quarters of the way around such dome. When the plate 14 and its walls 16 and 17 have thus been moved to register with one of the compartments within the container 10 it is only necessary to again tighten the knob 22 upon the stem 21 to thereby lock the device against further movement after which the condiment selected may be dispensed through the proper openings 23 in the conventional manner.

While but one form of the invention has been shown and described herein, it will be readily apparent to those skilled in the art that many minor modifications may be made without departing from the spirit of the invention or the scope of the appended claim.

What is claimed is:

In a condiment shaker, a container interiorly divided into a plurality of vertical sections, a dome threadedly connected to the upper end of the container and having a central opening, an arcuate plate positioned in the dome and extending three-quarters of the circumference of the container, a pair of interconnected walls extending upwardly into the dome from the free edges of the plate, a threaded pin projecting upwardly from the junction of said walls and through said opening, said dome having a plurality of openings of different sizes for the passage of different condiments and an arcuate slot, a handle attached to one of said walls and projecting through said slot, and a cap threaded on said pin and engaging the dome.

References Cited in the file of this patent

UNITED STATES PATENTS

| | | |
|---|---|---|
| 161,484 | Coulthard | Mar. 30, 1875 |
| 725,638 | Thurston | Apr. 14, 1903 |
| 1,758,117 | Kraft | May 13, 1930 |
| 1,925,962 | Hoyer | Sept. 5, 1933 |
| 2,302,186 | Caretto | Nov. 17, 1942 |
| 2,469,034 | Garris | May 3, 1949 |
| 2,502,449 | Garberding | Apr. 4, 1950 |
| 2,655,288 | Caretto | Oct. 13, 1953 |